US012070763B2

(12) United States Patent
Turner

(10) Patent No.: US 12,070,763 B2
(45) Date of Patent: Aug. 27, 2024

(54) REVERSIBLE CORNER SHIELD AND METHODS OF USE

(71) Applicant: Lamar Turner, Mableton, GA (US)

(72) Inventor: Lamar Turner, Mableton, GA (US)

( * ) Notice: Subject to any disclaimer, the term of this patent is extended or adjusted under 35 U.S.C. 154(b) by 7 days.

(21) Appl. No.: 17/549,986

(22) Filed: Dec. 14, 2021

(65) Prior Publication Data

US 2022/0184656 A1 Jun. 16, 2022

Related U.S. Application Data

(60) Provisional application No. 63/205,426, filed on Dec. 14, 2020.

(51) Int. Cl.

| | |
|---|---|
| ***B05B 12/34*** | (2018.01) |
| ***B05D 1/32*** | (2006.01) |
| *B05C 17/005* | (2006.01) |
| *B05C 17/02* | (2006.01) |
| *B05C 17/06* | (2006.01) |
| *B05C 21/00* | (2006.01) |

(52) U.S. Cl.

CPC .......... *B05B 12/34* (2018.02); *B05C 17/0052* (2013.01); *B05C 17/0225* (2013.01); *B05C 17/06* (2013.01); *B05C 21/005* (2013.01)

(58) Field of Classification Search

None

See application file for complete search history.

(56) References Cited

U.S. PATENT DOCUMENTS

| | | | | | |
|---|---|---|---|---|---|
| 2,290,472 | A * | 7/1942 | Hendrick | B05B 12/28 | 118/505 |
| 3,863,601 | A * | 2/1975 | Eckart, Jr. | B05B 12/28 | 118/504 |
| 3,942,472 | A * | 3/1976 | McAlister | B05B 12/28 | 118/504 |
| 4,085,703 | A * | 4/1978 | Glowacki | B05B 12/28 | 15/166 |
| 4,235,192 | A * | 11/1980 | Brubaker | B05B 12/28 | 118/504 |
| 4,248,914 | A * | 2/1981 | McClane | B05B 12/28 | 118/504 |
| 4,331,716 | A * | 5/1982 | Stark | B05D 1/32 | 427/284 |
| 4,398,495 | A * | 8/1983 | Harris, Jr. | B05B 12/20 | 428/152 |

(Continued)

*Primary Examiner* — Jethro M. Pence

(74) *Attorney, Agent, or Firm* — Mathew L. Grell, Esq.; Grell & Watson Patent Attorneys LLC

(57) ABSTRACT

A reversible corner shield apparatus and methods of use, v-shaped or angled shaped shield having a first linear shield member or wing and a second linear shield member or wing which are connected or joined at an apex therebetween, a mount or connector positioned proximate the apex between the first linear shield member or wing and a second linear shield member or wing, a hinged connector attached to the mount on a first end of the hinged connector and an elongated handle connected to a second end of the hinged connector to enable rotation between the handle and the shield and, thus, functions to assist a solo painter in rotating and positioning the shield around inner and outer corners of flooring, baseboard, door and window trim or ceiling to shield these non-painted surfaces from over-paint, over spray, uneven transition lines, unsightly paint dabs and the like.

9 Claims, 8 Drawing Sheets

(56) References Cited

U.S. PATENT DOCUMENTS

| | | | | | |
|---|---|---|---|---|---|
| 4,574,731 | A * | 3/1986 | Stevens | B05B 12/28 118/504 |
| 4,697,544 | A * | 10/1987 | Stevens | B05B 12/28 118/504 |
| 4,729,587 | A * | 3/1988 | Ward | B44D 3/123 248/113 |
| 4,962,722 | A * | 10/1990 | Thompson | B05B 12/28 118/504 |
| 5,103,762 | A * | 4/1992 | Long | B05B 12/28 118/504 |
| 7,291,228 | B2 * | 11/2007 | Gathright | B05B 12/28 118/504 |
| 7,854,212 | B2 * | 12/2010 | Queiroz | B05B 12/28 118/500 |
| 8,104,426 | B2 * | 1/2012 | Gringer | B05B 12/28 15/245.1 |
| 8,632,022 | B2 * | 1/2014 | Potter | B05B 12/36 239/521 |
| 8,651,047 | B1 * | 2/2014 | Uri | F16M 11/041 118/504 |
| 9,539,601 | B2 * | 1/2017 | Ruha | B05B 12/28 |
| 9,956,568 | B2 * | 5/2018 | O'Brien | B05C 21/005 |
| 9,956,571 | B2 * | 5/2018 | Tatia | B05B 12/20 |
| 10,857,559 | B2 * | 12/2020 | Masalosalo | B05C 21/005 |
| 11,458,495 | B2 * | 10/2022 | Ranweiler | B05B 12/32 |
| 2005/0035221 | A1 * | 2/2005 | Gathright | B05B 12/28 239/524 |
| 2008/0098956 | A1 * | 5/2008 | Serfozo | B05B 12/28 118/504 |
| 2009/0056622 | A1 * | 3/2009 | Potter | B05B 12/34 118/323 |
| 2010/0126416 | A1 * | 5/2010 | Gringer | B05B 12/28 118/504 |
| 2014/0209019 | A1 * | 7/2014 | Ruha | B05B 12/28 164/113 |
| 2017/0189925 | A1 * | 7/2017 | O'Brien | B05C 21/005 |
| 2022/0080442 | A1 * | 3/2022 | Dominguez Diaz | B05B 12/22 |
| 2022/0080443 | A1 * | 3/2022 | Ranweiler | B05B 12/32 |

* cited by examiner

REVERSIBLE CORNER SHIELD AND METHODS OF USE

CROSS-REFERENCE TO RELATED APPLICATIONS

To the full extent permitted by law, the present United States Non-provisional Patent Application hereby claims priority to and the full benefit of, U.S. Provisional Application No. 63/205,426, filed on Dec. 14, 2020, entitled "Reversible Corner Shield", which is incorporated by reference herein in its entirety.

FIELD OF THE DISCLOSURE

The present disclosure is directed to painting accessories and methods of use thereof. More specifically, the present disclosure is directed to a paint shield to enable an operator to efficiently and effectively paint corners.

BACKGROUND

When painting, it is desirable to protect surfaces not designated to receive paint from the misapplication of paint and other drywall coating materials. For example, it is often desirable to paint the main wall surface but not the flooring, baseboard, door and window trim or ceiling. Currently there are various approaches have been utilized such as masking and shielding techniques that are inefficient in use.

One prior approach of masking is to utilize tape to mask or shield a border along the edges and corners and other surfaces or transitions. One disadvantage or drawback to this approach is that applying masking tape is awkward and time consuming, requiring considerable labor and cost to in preparation of painting. Additionally, the tape can only be used once and then must be removed and discarded. Also, the tape cannot always in practice be applied with the precision required for a satisfactory shield or line between transition surfaces. For these and similar reasons. Many painters try to free hand transition lines without any masking tape thereby resulting in uneven transition lines, unsightly paint dabs and the like.

To avoid these problems associated with masking tape and to protect a non-designated surface from the misapplication of paint and other coating materials, painters have improvised by using linear shields formed from a flat strip of cardboard, plastic, or other like material with a straight edge of variable lengths. These flat linear strip shields are manually held or taped in place along a transition during painting.

At least some known types of flat linear strip shields facilitate preventing painting errors, such as uneven transition lines, unsightly paint dabs and the like on a wall or surface being painted whether cutting in with a paint brush or spray gun utilized to apply paint or other coating to an adjacent or nearby surface or wall. One disadvantage or drawback to this approach is that flat linear strip shields must be held by the painter in close proximity to the paint applicator when painting a surface or wall but shielding the flooring, baseboard, door and window trim or ceiling. Another disadvantage flat linear strip shields do not enable full shielding of a corner area whether around an inner or outer corner of flooring, baseboard, door and window trim or ceiling.

Therefore, it is readily apparent that there is a recognizable unmet need for a reversible corner shield apparatus and methods of use that may be configured to address at least some aspects of the problems discussed above common to painters attempting to quickly and efficiently paint a surface or wall.

SUMMARY

Briefly described, in an example embodiment, the present disclosure may overcome the above-mentioned disadvantages and may meet the recognized need for a reversible corner shield apparatus and methods of use, the apparatus includes a v-shaped or angled shaped shield having a first linear shield member or wing and a second linear shield member or wing which are connected or joined at an apex therebetween, a mount or connector positioned proximate the apex between the first linear shield member or wing and a second linear shield member or wing, a hinged connector attached to the mount on a first end of the hinged connector and an elongated handle connected to a second end of the hinged connector to enable rotation between the handle and the shield and, thus, functions to assist a solo painter in rotating and positioning the shield around inner and outer corners of flooring, baseboard, door and window trim or ceiling to shield these non-painted surfaces from over-paint, over spray, uneven transition lines, unsightly paint dabs and the like.

Accordingly, in one aspect, the present disclosure makes it quicker for a painter to apply paint to a wall or surface without over-paint, over spray, uneven transition lines, unsightly paint dabs and the like around inner and outer corners of flooring, baseboard, door and window trim or ceiling.

Accordingly, in another aspect, the present disclosure may include a v-shaped or angled shaped shield having a first linear shield member or wing and a second linear shield member or wing which are connected or joined at an apex, wherein the two members may enable angle adjustment to therebetween to enable a painter to match the angle of the inner and outer corners.

Accordingly, in another aspect, the present disclosure may include a variety of dimensions of first linear shield member or wing and a second linear shield member to accommodate different over-paint or over spray requirements.

Accordingly, in another aspect, the present disclosure may include any handle including length adjustable handles or elongated members with a hand grip.

Accordingly, in another aspect, the present disclosure may include any hinge or swivel element capable of enabling at least ninety but up to approximately at least one hundred-eighty degrees of rotation between the handle and the shield to go from a wall corner to a ceiling corner shield.

In an exemplary embodiment of a reversible corner shield apparatus to prevent over-paint or over spray when painting a room, including an angled shield, said shield having a first linear shield member and a second linear shield member joined at an apex, a mount positioned proximate said apex, an elongated handle having first handle end and second handle end, and a hinge element removeably affixed to said mount and said first handle end of said handle.

In another exemplary embodiment of a method of shielding over spray when painting a corner of a surface area, said method including the steps of providing a reversible corner shield having an angled shield, said shield having a first linear shield member and a second linear shield member joined at an apex, a mount positioned proximate said apex, an elongated handle having first handle end and second handle end, and a hinge element removeably affixed to said mount and said first handle end of said handle, gripping a handle, adjusting an angle between said hinge element and said handle, positioning said first linear shield member and said second linear shield member against a transition line of the corner, applying the paint to the surface area adjacent said transition line, and shielding said transition line from over spray.

A feature of the present disclosure may include its ability to shield a wall or surface from over-paint, over spray, uneven transition lines, unsightly paint dabs and the like around inner and outer corners of flooring, baseboard, door and window trim or ceiling.

A feature of the present disclosure may include its ability to provide a length adjustable or elongated members to allow the painter to support the shield while keeping his hand and arm out of the painting area of the wall or surface.

A feature of the present disclosure may include its ability to provide a curved or creased between shield top edge and bottom edge to enable spray paint or brush bristles to contact the transition edge between paint area and non-paint areas.

A feature of the present disclosure may include forming the shield of materials that can easily be washed or wiped in between uses to remove paint gathered along the shield edge.

A feature of the present disclosure may include providing a paint shield that can be operated by a solo painter to efficiently and effectively paint a wall or surface around an inward, outward, or sideways facing corner or other corner.

A feature of the present disclosure may include providing a swivel able or reversible paint shield that can be utilized to paint a wall or surface around an inward, outward, or sideways facing corner and thus obviate the need for multiple shields.

A feature of the present disclosure may include providing a hand held reversible v-shaped shield designed to expedite the work of cleaning, painting, or varnishing woodwork, walls, surfaces having misapply paint around an inward, outward, or sideways facing corner.

These and other features of the reversible corner shield apparatus and methods of use will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present reversible corner shield apparatus and methods of use will be better understood by reading the Detailed Description of the Preferred and Selected Alternate Embodiments with reference to the accompanying drawing Figures, in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in figures specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Figure 1:
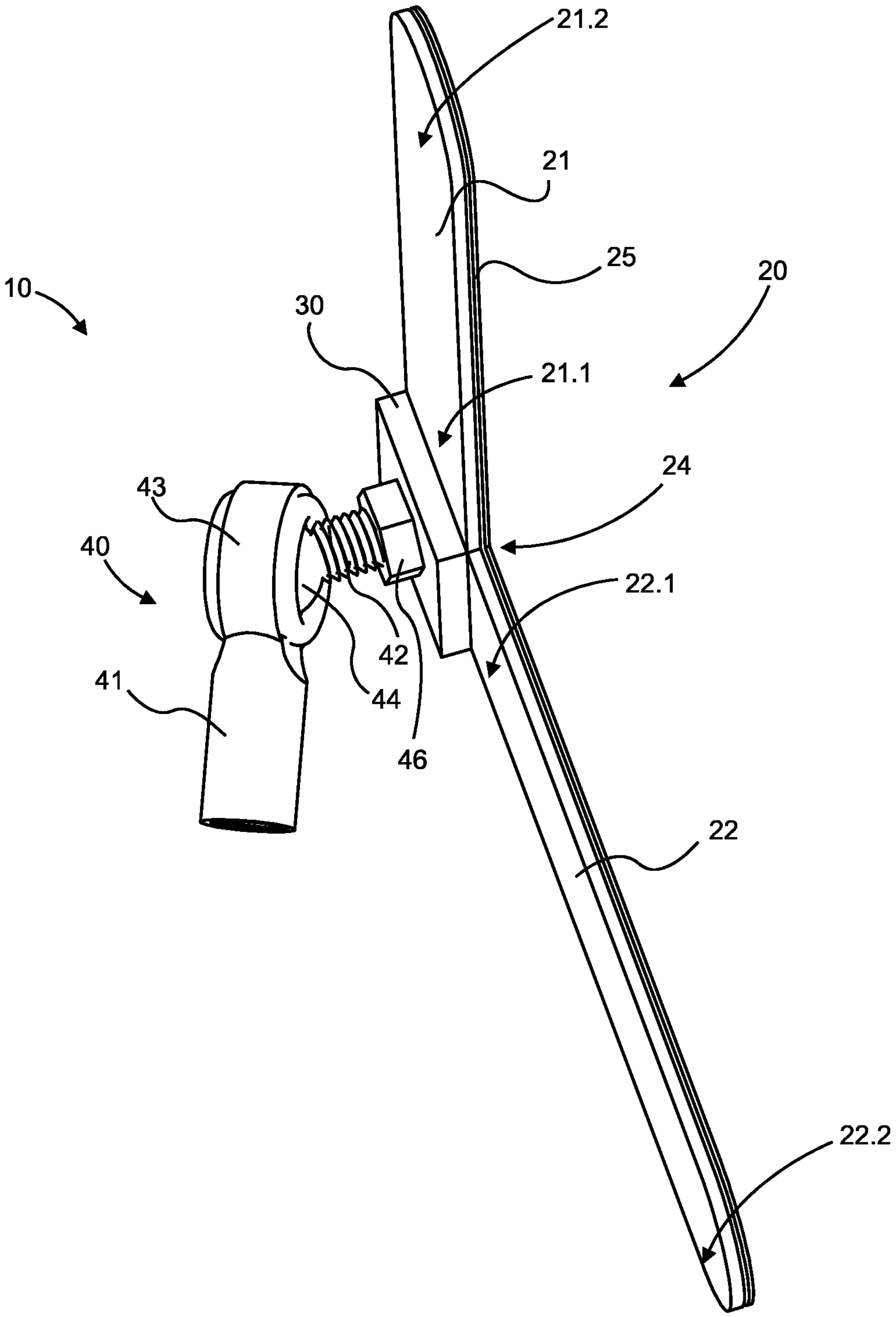
FIG. 1 is a perspective view of the reversible corner shield apparatus according to select embodiments of the instant disclosure.
Figure 2:
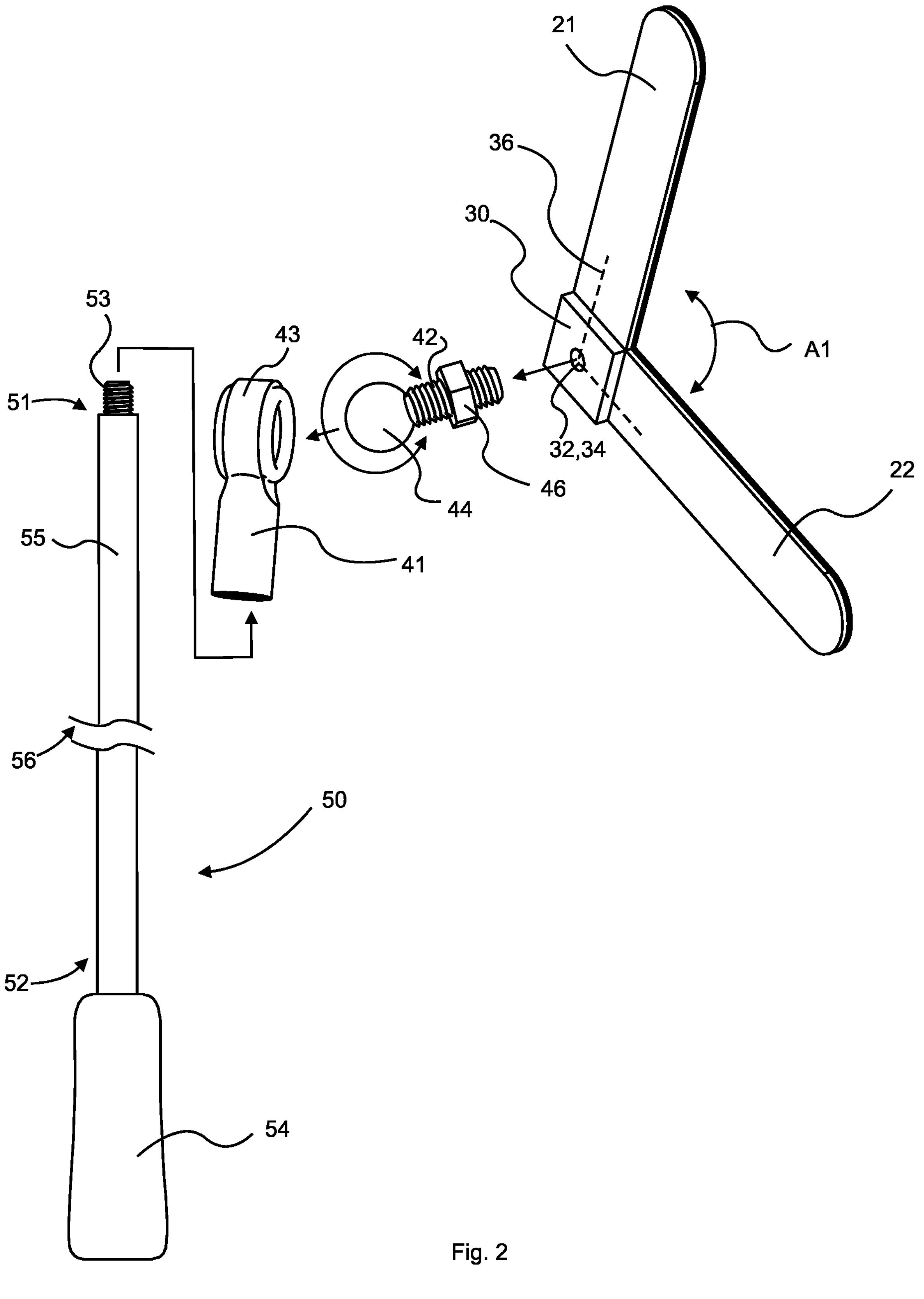
FIG. 2 is a perspective view of the separate parts of reversible corner shield apparatus according to select embodiments of the instant disclosure.

Referring now to FIGS. 1 and 2, by way of example, and not limitation, there is illustrated an example embodiment of reversible corner shield 10, according to this select embodiment. In this select embodiment, reversible corner shield 10 may include a paint guard, such as shield 20 configured as v-shaped, angled, adjustable angle, ninety digress or like shape, where shield 20 may be configured and sized to cover a corner C transition between a surface area or wall W. Shield 20 may include a pair of wing members, such as first linear shield member 21 and second linear shield member 22, having a perimeter edge 25, which may be connected or joined at apex 24.

It is contemplated herein that first linear shield member 21 and second linear shield member 22 of shield 20 may be adjustable and pivot about pivot joint 32 proximate apex 24 to enable painter P to adjust the angle A between first linear shield member 21 and second linear shield member 22 in order to accommodate a variety of slight variations in ninety degree corners.

It is further contemplated herein that reversible corner shield 10 and shield 20 may be utilized by a painter as a shield around inner and outer corners of flooring, baseboard, door and window trim or ceiling to shield these non-painted surfaces from over-paint, over spray, uneven transition lines, unsightly paint dabs and the like.

It is still further contemplated herein that first linear shield member 21 and second linear shield member 22 of shield 20 may be sized in different width and length to protect against a variety of possible over-paint, over spray, uneven transition lines, unsightly paint dabs and the like.

Moreover, a connector, such as mount 30 may be positioned proximate apex 24 between first linear shield member 21 and second linear shield member 22 to receive a fixed position handle or a hinge element and a handle. It is contemplated herein that mount 30 may be one in the same as apex 24, a junction proximate first linear shield member 21 and second linear shield member 22 or any location or position thereon between first linear shield member 21 and second linear shield member 22. Mount 30 may include an aperture 32 having internal threads to receive a fixed position handle or a hinge element and a handle and enable angle A adjustment and lock in place between first linear shield member 21 and second linear shield member 22 in order to accommodate a variety of slight variations in ninety degree corners.

Furthermore, mount 30 may include pivot joint 34 between first linear shield member 21 and second linear shield member 22 to accommodate angle variation in angle A1, such as ninety degrees (90), forty-five degrees (45) and other angles are contemplated herein. In addition mount 30 may include biasing element 36 positioned proximate apex 24 between first linear shield member 21 and second linear shield member 22 to enable first linear shield member 21 and second linear shield member 22 to stretch open for angle A1 adjustment and tension closed pivot joint 32 in order to clamp down first linear shield member 21 and second linear shield member 22 against variations in ninety degree corners to enable a tight fit and a clean transition line of paint between surfaces.

It is contemplated herein that transitions between parts may be affixed or removeably affixed by coupling, crimp, adhesive, bolt, washer, and nut, pin, rivet or other known way to make a connection.

Furthermore, a hinge element, such as universal joint 40 may be removeably affixed to mount 30 or connected or removeably connected to first linear shield member 21 and/or second linear shield member 22, or a junction, such as apex 24 therebetween. Universal joint 40 may include housing 43 surrounding spherical rod 44 to enable three dimensional pivot or rotation of universal joint 40. Universal joint 40 may include first connector end 41 connected to housing 43 to receive a handle and second connector end 42 and lock nut 46 connected to spherical rod 44 to be removeably affixed to mount 30. Universal joint 40 may be configured as a hinge or pivot point connector to enable rotation and pivot between the handle and shield 20 to enable a painter to position shield 20 around inner and outer corners of flooring, baseboard, door and window trim or ceiling to shield these non-painted surfaces from over-paint, over spray, uneven transition lines, unsightly paint dabs and the like.

It is recognized herein that hinge element may include any configuration of hinge capable providing enable rotation and pivot between the handle and shield 20, including but not limited to swivel joint, lockable swivel joint, rotating joint, pivot joint, universal joint, ball joint and the like to enable a painter or user to position shield 20 around inner and outer corners of flooring, baseboard, door and window trim or ceiling to shield these non-painted surfaces from over-paint, over spray, uneven transition lines, unsightly paint dabs and the like.

Still furthermore, reversible corner shield 10 may include handle 50 having first handle end 51 and second handle end 52. First handle end 51 may be affixed or removeably affixed to connector end 41 via threads 53. First handle end 51 may include threaded end 53 to enable first handle end 51 to be removeably affixed to threaded interior of connector end 41. Second handle end 52 may include hand grip 54 to enable a painter P to grip handle 50.

It is recognized herein that handle 50 may include an adjustment device 56 to enable length of handle to be extended (extension) and/or retracted (retraction) to enable painter P to reach high and low with reversible corner shield 10.

Figure 3:
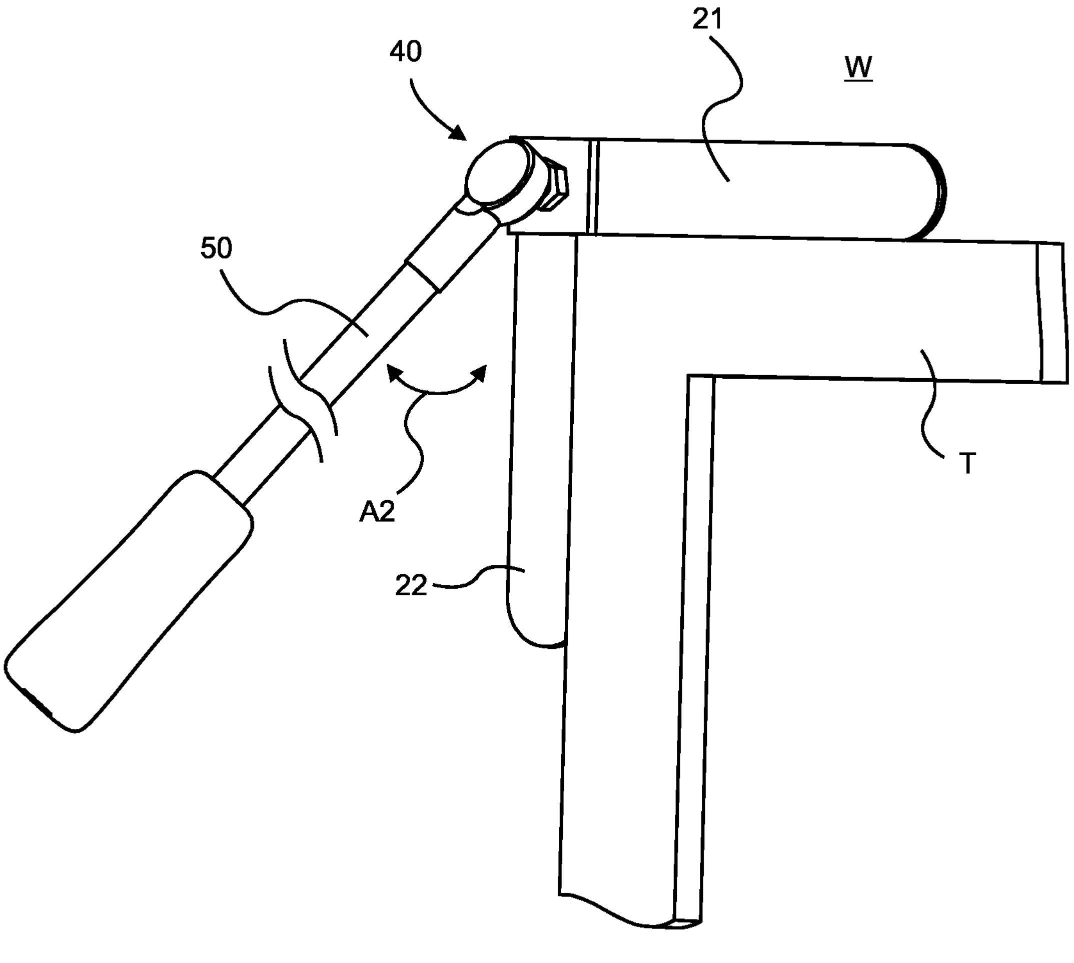
FIG. 3 is a side view of the reversible corner shield apparatus positioned around a trim for a door or window according to select embodiments of the instant disclosure.

Referring now to FIG. 3, by way of example, and not limitation, there is illustrated an example embodiment of reversible corner shield 10, shown in use. In use, first linear shield member 21 and second linear shield member 22 are positioned adjacent angled trim T to cover wall W from paint being applied to trim T by a painter P. Handle 50 may be angled along angle A2 via universal joint 40 to assist painter P in positioning reversible corner shield 10 against trim T. it is contemplated herein that trim T may include door, window, kick board, shoe molding, base board, base cap, head jam, head casing, side jam, side casing, chair rail, wainscoting, crown, ceiling medallion, grille, stool, apron, plinth block, and the like.

Figure 4A:
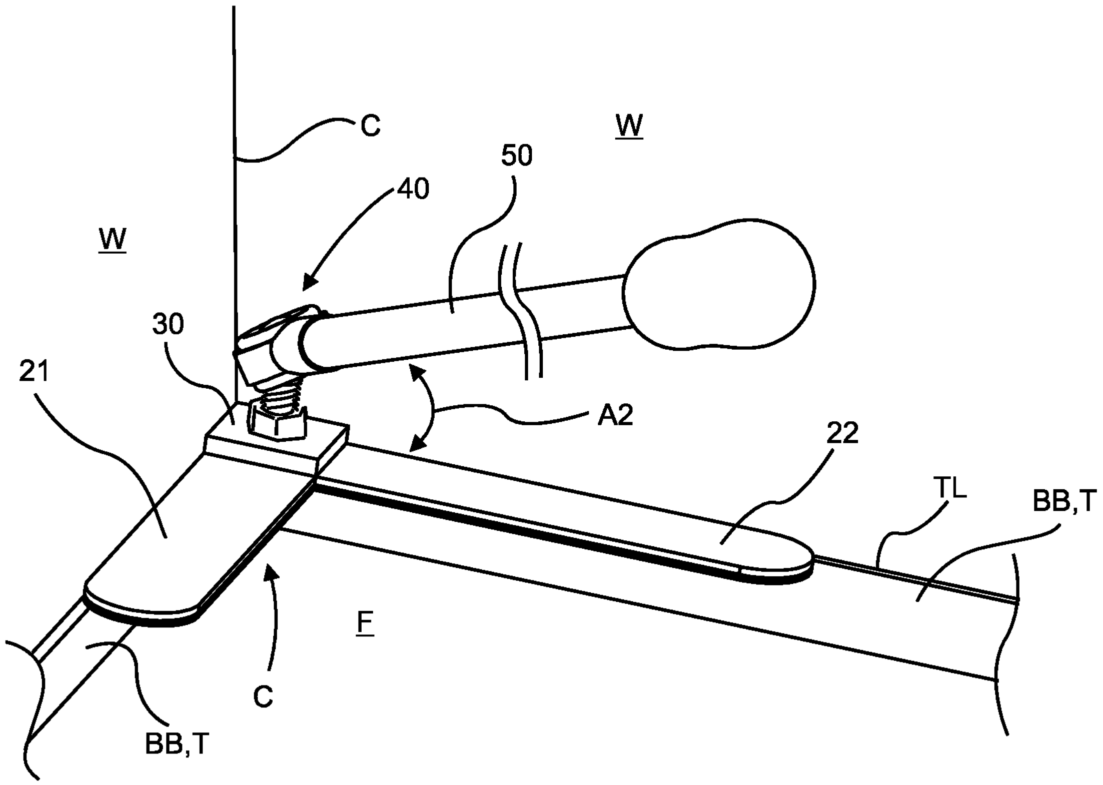
FIG. 4A is a perspective view of the reversible corner shield apparatus positioned in an in-corner to shield the wall according to select embodiments of the instant disclosure.
Figure 4B:
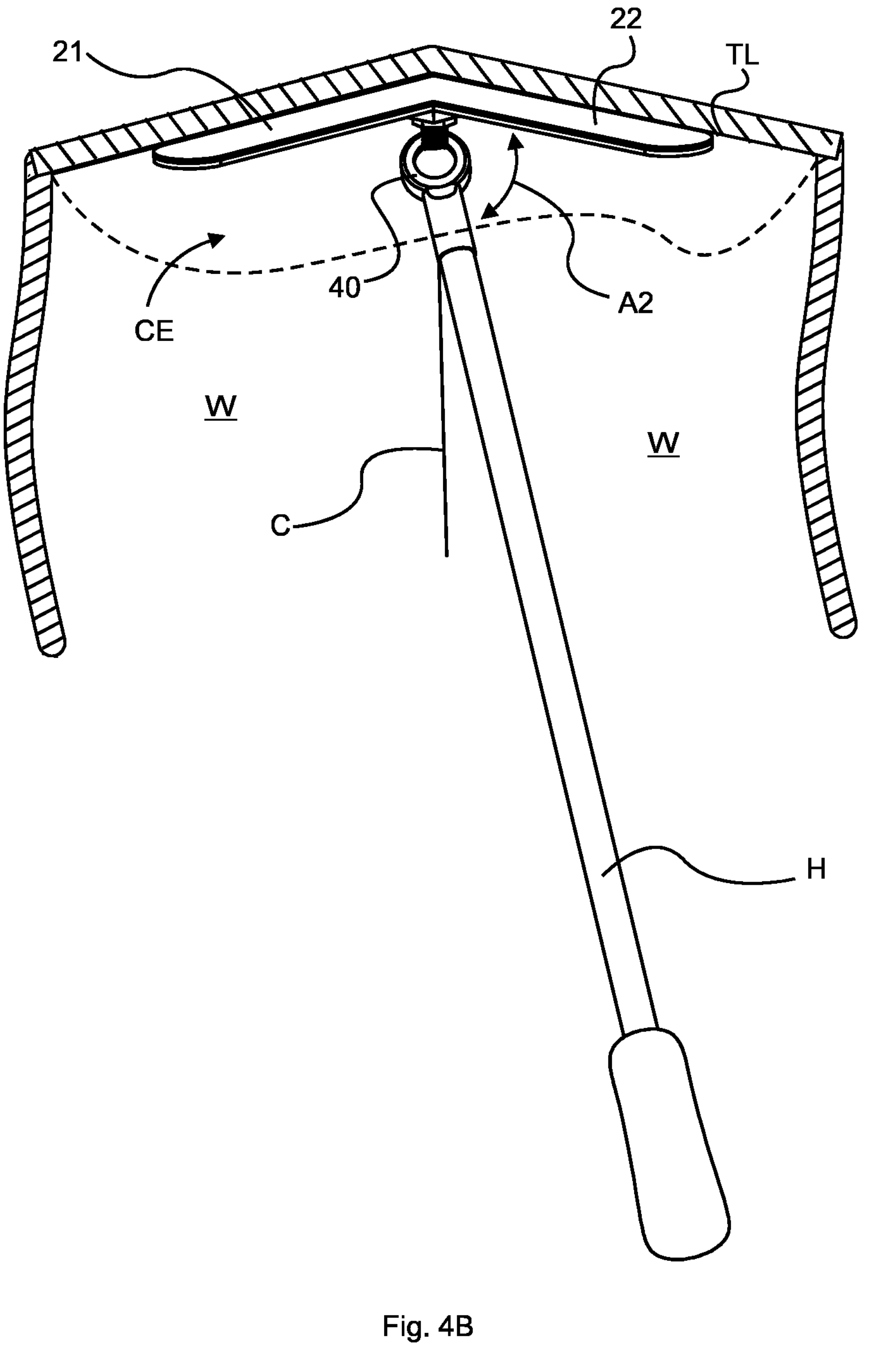
FIG. 4B is a perspective view of the reversible corner shield apparatus positioned in an in-corner to shield the ceiling according to select embodiments of the instant disclosure.
Figure 6:
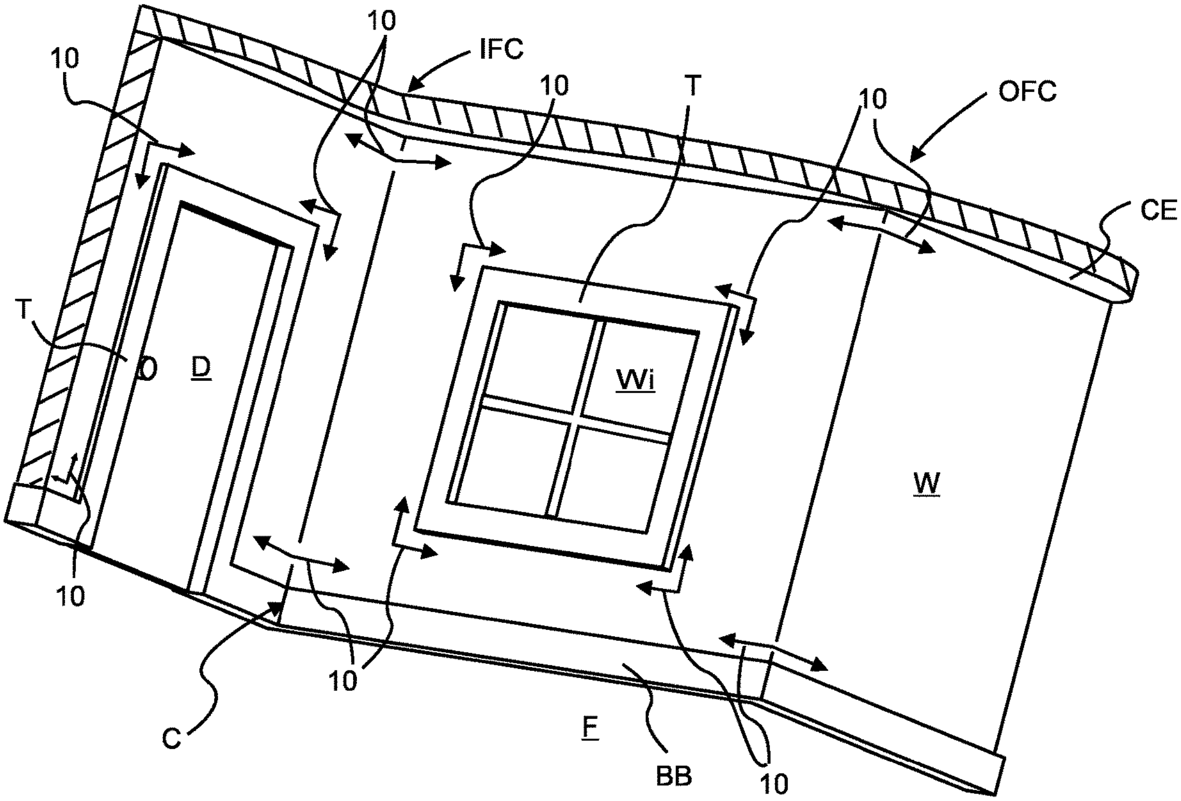
FIG. 6 is a perspective view of the reversible corner shield apparatus according to select embodiments of the instant disclosure showing positions of placement in a room.

Referring now to FIGS. 4 and 6, by way of example, and not limitation, there is illustrated an example embodiment of reversible corner shield 10, shown in use. In use, first linear shield member 21 and second linear shield member 22 are positioned adjacent transition lines TL of an inward facing corner IFC between the baseboard BB and wall W to cover baseboard BB from paint being applied to wall W by a painter P. Handle 50 may be angled along angle A2 via universal joint 40 to assist painter P in positioning reversible corner shield 10 against baseboard BB. It is recognized herein that reversible corner shield 10 may be utilized adjacent transition lines TL of an inward facing corner IFC between the ceiling C and wall W to cover ceiling CE from paint being applied to wall W by a painter, as shown in FIG. 4B.

Figure 5:
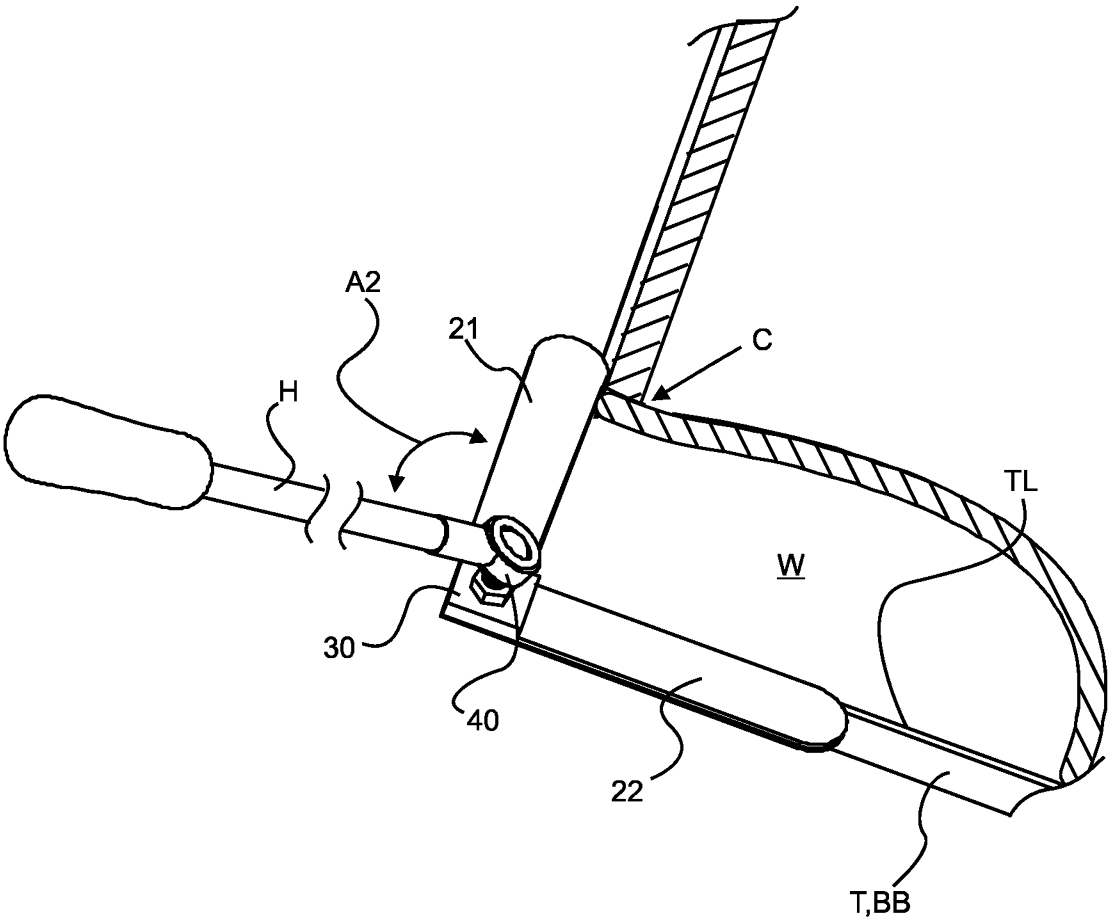
FIG. 5 is a perspective view of the reversible corner shield apparatus positioned in an out-corner to shield the ceiling according to select embodiments of the instant disclosure.

Referring now to FIGS. 5 and 6, by way of example, and not limitation, there is illustrated an example embodiment of reversible corner shield 10, shown in use. In use, first linear shield member 21 and second linear shield member 22 are positioned adjacent transition lines of an outward facing corner OFC between base board BB and wall W to cover base board BB from paint being applied to wall W by a painter P. Handle 50 may be angled along angle A2 via universal joint 40 to assist painter P in positioning reversible corner shield 10 against wall W. It is recognized herein that reversible corner shield 10 may be utilized adjacent transition lines TL of an outward facing corner OFC between ceiling CE and wall W to cover ceiling from paint being applied to wall W by a painter.

It is contemplated herein that reversible corner shield apparatus may be constructed of metal, aluminum, wood, rigid plastic, nylon, or the like and of different dimensions. This and other materials herein may be constructed of metal, steel, aluminum, alloy, or plastic or more specifically high density polyethylene or similar high tensile or strengthened materials, as these material offers a variety of forms and shapes and provide strength; however, other suitable materials or the like, can be utilized, provided such material has sufficient strength and/or durability as would meet the purpose described herein to enable reversible corner shield apparatus 10 to be used as a work piece, or painter accessory.

It is understood herein that various changes in the material used, shape, size, arrangement of parts, and parts are connected with adhesive, bolts, pins, rivets, screws or similar fasteners without departing from the spirit of the scope of the claims herein.

It is further understood herein that the parts and elements of this disclosure may be located or position elsewhere based on one of ordinary skill in the art without deviating from the present disclosure.

Referring now to FIG. 6, by way of example, and not limitation, there is illustrated an example embodiment of reversible corner shield 10, shown in use in different positions around a room to be painted. Room 600 may include walls W, trim T corners around doors D, windows Wi, baseboard BB corners, floor F corners, ceiling C corners, whether inward IFC or outward OFC facing corners ("corner C").

Figure 7:
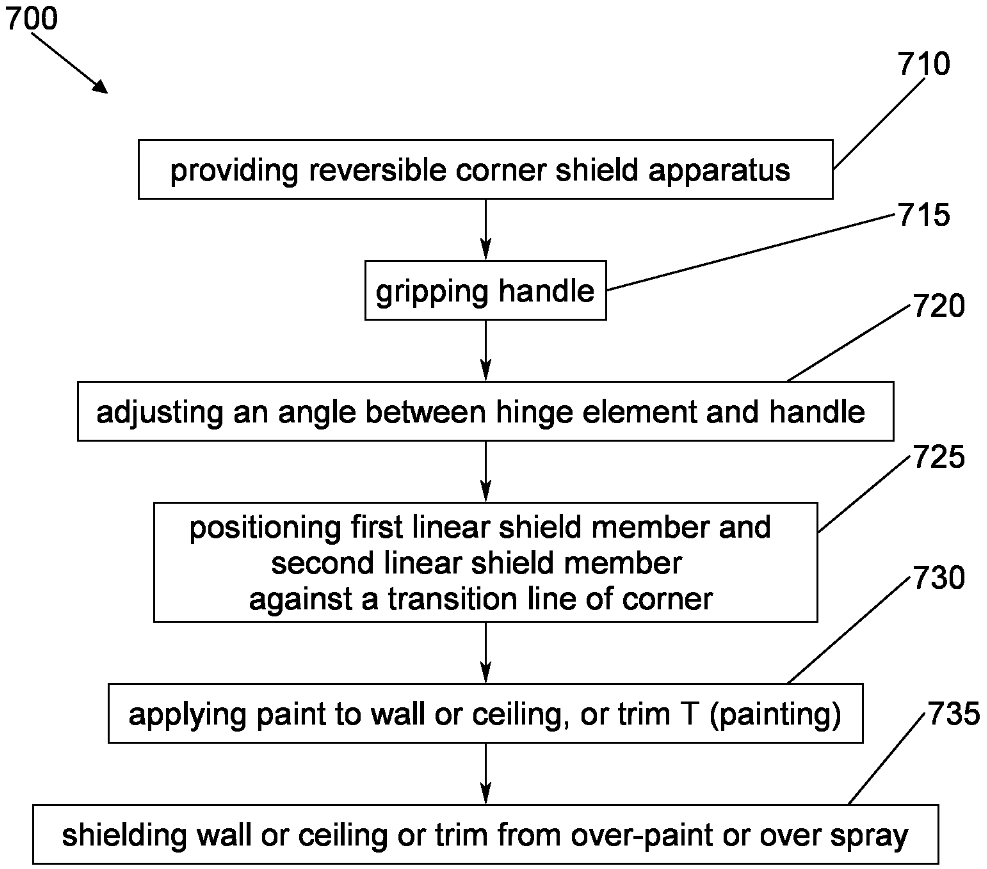
FIG. 7 is a flow diagram depicting how reversible corner shield apparatus of FIGS. 1-7 is preferably utilized.

Referring now to FIGS. 6 and 7, there is illustrated a flow diagram 700 of a method of utilizing reversible corner shield apparatus 10 to prevent over-paint, over spray, uneven transition lines, unsightly paint dabs and the like when painting a room R. In block or step 710, providing reversible corner shield apparatus 10 having at least shield 20 may include a pair of wing members, such as first linear shield member 21 and second linear shield member 22 which may be connected or joined at apex 24, mount 30, hinge element, universal joint 40, and handle 50 as described above in FIGS. 1-6. In block or step 715, gripping handle 50 by painter P. In block or step 720 adjusting an angle A2 between universal joint 40 and handle 50 to assist with positioning first linear shield member 21 and second linear shield member 22 in corner C. In block or step 725, positioning first linear shield member 21 and second linear shield member 22 against a transition line of corner C. In block or step 730, applying paint to a surface area adjacent transition line TL, such as wall W or ceiling C, or trim T (painting). In block or step 735, shielding transition line TL and beyond, such as wall W or ceiling C, or trim T from over-paint, over spray, uneven transition lines, unsightly paint dabs and the like when painting a room R.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein but is limited only by the following claims.

The invention claimed is:

1. A reversible corner shield apparatus to prevent over-paint or over spray when painting a corner of a room, said apparatus comprising:

- an angled shield, said shield having a first linear shield member and a second linear shield member joined at an apex;
- a mount positioned proximate said apex;
- an elongated handle having first handle end and second handle end; and
- a universal joint removeably affixed to said mount, said universal joint having a spherical rod with a first connector end being spherical to enable three dimensional pivot therein a housing and a second connector end to removeably connect to said mount, said housing affixed to said first handle end of said handle.

2. The apparatus of claim 1, wherein said mount further comprises an aperture having internal threads to receive said second connector end having threads.

3. The apparatus of claim 1, wherein said apex further comprises a pivot joint between said first linear shield member and said second linear shield member to accommodate an angle variation in the corners.

4. The apparatus of claim 3, further comprises a biasing element therebetween between said first linear shield member and said second linear shield member.

5. The apparatus of claim 1, wherein said universal joint is configured having a second connector end and a lock nut connected to said spherical rod to be removeably affixed to said aperture in said mount.

6. The apparatus of claim 1, further comprising a hand grip affixed to said second handle end of said handle.

7. The apparatus of claim 1, wherein said handle further comprises an adjustment device to enable handle extension and retraction.

8. The apparatus of claim 1, wherein said first linear shield member and said second linear shield member are fixed at a ninety degree angle.

9. A reversible corner shield apparatus to prevent over-paint or over spray when painting a corner of a room, said apparatus comprising:

- an angled shield, said shield having a first linear shield member and a second linear shield member joined at an apex;
- an elongated handle having first handle end and second handle end; and
- a universal joint removeably affixed to said apex, said universal joint having a spherical rod with a first connector end being spherical to enable three dimensional pivot therein a housing and a second connector end to removeably connect to said apex, said housing affixed to said first handle end of said handle.

* * * * *